United States Patent
Fauteux

(10) Patent No.: US 11,473,653 B2
(45) Date of Patent: Oct. 18, 2022

(54) FIXED RATIO TRACTION OR FRICTION DRIVE

(71) Applicant: VECTIS DRIVE INC., Montreal (CA)

(72) Inventor: Philippe Fauteux, Saint-Charles-de-Drummond (CA)

(73) Assignee: VECTIS DRIVE INC., Montreal (CA)

( * ) Notice: Subject to any disclaimer, the term of this patent is extended or adjusted under 35 U.S.C. 154(b) by 0 days.

(21) Appl. No.: 16/962,447

(22) PCT Filed: Jun. 3, 2019

(86) PCT No.: PCT/CA2019/050768
§ 371 (c)(1),
(2) Date: Jul. 15, 2020

(87) PCT Pub. No.: WO2019/232620
PCT Pub. Date: Dec. 12, 2019

(65) Prior Publication Data
US 2021/0079986 A1    Mar. 18, 2021

Related U.S. Application Data

(60) Provisional application No. 62/681,464, filed on Jun. 6, 2018.

(51) Int. Cl.
*F16H 13/08* (2006.01)
*F16H 13/10* (2006.01)
*F16H 57/08* (2006.01)

(52) U.S. Cl.
CPC .............. *F16H 13/08* (2013.01); *F16H 13/10* (2013.01); *F16H 57/082* (2013.01); *F16H 2057/085* (2013.01)

(58) Field of Classification Search
CPC ........... F16H 13/06; F16H 13/08; F16H 13/10
See application file for complete search history.

(56) References Cited

U.S. PATENT DOCUMENTS

| 1,212,462 A | 1/1917 | Donnelly |
| 1,399,443 A | 12/1921 | Rennerfelt |

(Continued)

FOREIGN PATENT DOCUMENTS

| CN | 106838190 | 6/2017 |
| DE | 19838409 | 2/1999 |

(Continued)

OTHER PUBLICATIONS

International Search report, Sorin Muntean, dated Aug. 7, 2019, 3 pages.

*Primary Examiner* — Erin D Bishop
(74) *Attorney, Agent, or Firm* — Benoit & Cote Inc.; Charles-André Caron

(57) ABSTRACT

A multistage friction/traction speed adapter having a first drive which can include a plurality of free rollers orbiting around a sun element within a frame, transmitting their orbiting movement to guided rollers which do not contact the sun element or the frame. The guided rollers are driven in the orbiting movement and transmit the rotary movement to a carrier via corresponding pins which engage with the carrier. A second drive can include rollers having radial position variation which is prevented from being transmitted to the carrier by providing accommodation at the pin level, either by providing a bushing around the pins with a bore that is eccentric relative to its outer surface, either by engaging the pins into the carriers in portions thereof which are made more flexible. A friction/traction gear at an angle is also disclosed.

13 Claims, 9 Drawing Sheets

(56) References Cited

U.S. PATENT DOCUMENTS

| | | |
|---|---|---|
| 1,985,645 A | 12/1934 | Rosner |
| 2,152,797 A | 4/1939 | Erban |
| 2,815,685 A | 12/1957 | Parrett |
| 3,244,026 A | 4/1966 | De Kay |
| 3,375,739 A | 4/1968 | Nasvytis |
| 3,475,993 A | 11/1969 | Hewko |
| 3,481,213 A | 12/1969 | Macchia |
| 3,776,051 A | 12/1973 | Kraus |
| 3,817,125 A | 6/1974 | Nakamura et al. |
| 3,941,004 A | 3/1976 | Kraus |
| 3,945,270 A | 3/1976 | Nelson et al. |
| 4,060,010 A * | 11/1977 | Heden .................. F16H 13/06 475/183 |
| 4,121,331 A | 10/1978 | Fukuma et al. |
| 4,157,668 A | 6/1979 | Fukuma et al. |
| 4,235,128 A | 11/1980 | Kanervo et al. |
| 4,296,648 A | 10/1981 | Okano et al. |
| 4,302,988 A | 12/1981 | Takahashi et al. |
| 4,483,216 A | 11/1984 | Takahashi et al. |
| 4,541,305 A | 9/1985 | Hamabe et al. |
| 4,561,326 A | 12/1985 | Hamabe et al. |
| 5,033,921 A | 7/1991 | Yasuhara et al. |
| 5,035,153 A | 7/1991 | Andreson et al. |
| 5,362,284 A | 11/1994 | Brewer |
| 5,688,201 A | 11/1997 | Zhou |
| 5,851,163 A | 12/1998 | Kawase et al. |
| 6,083,133 A | 7/2000 | Dye |
| 6,095,940 A | 8/2000 | Ai et al. |
| 6,554,730 B1 | 4/2003 | Sakai et al. |
| 6,758,780 B2 | 7/2004 | Witzel |
| 6,796,126 B2 | 9/2004 | Hasegawa et al. |
| 7,018,316 B2 | 3/2006 | Ai |
| 7,118,512 B2 | 10/2006 | Flugrad |
| 7,264,567 B2 | 9/2007 | Ai |
| 7,553,254 B2 | 6/2009 | Rohs et al. |
| 7,651,436 B2 | 1/2010 | Sugitani |
| 7,756,448 B2 | 7/2010 | Marumoto |
| 7,843,095 B2 | 11/2010 | Ai et al. |
| 8,033,953 B2 | 10/2011 | Pawloski |
| 8,152,677 B2 | 4/2012 | Knepper et al. |
| 8,187,142 B2 | 5/2012 | Rohs et al. |
| 8,933,576 B2 | 1/2015 | Himmelmann |
| 9,289,878 B2 | 3/2016 | Livingston et al. |
| 9,321,172 B2 | 4/2016 | Johnson et al. |
| 10,197,150 B2 | 2/2019 | Anglin et al. |
| 2003/0232694 A1 | 12/2003 | Carter et al. |
| 2005/0153812 A1 | 7/2005 | Box et al. |
| 2008/0146395 A1 | 6/2008 | Ai et al. |
| 2011/0111918 A1 | 5/2011 | Rohs |
| 2013/0035199 A1 | 2/2013 | Stiene et al. |
| 2013/0337957 A1 | 12/2013 | Vranish |
| 2015/0167821 A1 | 6/2015 | Watanabe |
| 2017/0009873 A1 | 1/2017 | Watanabe |
| 2017/0146096 A1 | 5/2017 | Watanabe |

FOREIGN PATENT DOCUMENTS

| | | |
|---|---|---|
| DE | 19900010 | 8/2000 |
| EP | 0319750 | 6/1989 |
| GB | 759526 | 10/1956 |
| GB | 2014269 | 8/1982 |
| JP | 1994206553 | 8/1995 |
| JP | 2006214560 | 8/2006 |
| JP | 2007155039 | 6/2007 |
| WO | 2005106265 | 11/2005 |
| WO | 2007049444 | 5/2007 |

* cited by examiner

FIXED RATIO TRACTION OR FRICTION DRIVE

CROSS-REFERENCE TO RELATED APPLICATIONS

This application claims benefit or priority of U.S. provisional patent application 62/681,464, filed Jun. 6, 2018, which is hereby incorporated herein by reference in its entirety.

BACKGROUND

(a) Field

The subject matter disclosed generally relates to traction or friction gears or drives. More specifically, it relates to a fixed-ratio drive.

(b) Related Prior Art

In mechanical systems, rotary speed adapters can be used to adapt the torque and speed of the energy source to the load. For example, speed reducers are often used to increase the torque of electromagnetic motors. Another example is a machine tools spindle where, this time, a speed increase between the motor and the tool can be desirable.

Today, most high-performance speed adapters rely on the meshing of toothed spur or helical gears. When a compact integration is desired, the epicyclic or planetary configuration is often selected. In this configuration, the load is shared by several planet gears orbiting a sun gear. As with other toothed gear configurations however, a number of undesirable effects are introduced. First, with teeth bending under load, some flexibility is added, reducing the control performance. Moreover, because of the discontinuous nature of this meshing and associated rigidity fluctuation, noise and vibrations occur, limiting the allowable speed. Furthermore, to allow proper function, some backlash must be introduced, further reducing control performance and positioning accuracy.

Other toothed speed adapter technologies are available. The strain wave and cycloidal technologies are of particular interest for compact drives. A strain wave gearing uses an elliptical bearing to deform a toothed flexible cup that engages with an internally toothed annulus gear. This result in a compact drive with no backlash, but some flexibility. A cycloidal gear, on the other hand, uses large eccentrically driven toothed disks that engage with an internally toothed annulus gear. The teeth are shaped so that contacts are mostly rolling, allowing for preloads and close to zero backlash. Their manufacturing however requires precision techniques that can be challenging and costly.

SUMMARY

The disclosed invention relates to compact arrangements of fixed ratio traction or friction gears—or drives—that transmit rotary motion between input and output members using friction or traction forces between smooth surfaces in rolling contact.

A rotary speed adapter is analog to a lever. One of the three ports—generally fixed—acts as the fulcrum. Depending on the length ratios, the force can be increased or decreased between the two other ports, with speed modified conversely. The disclosed drive arrangements focus on speed reduction. However, they can be used as increasers if the input and output ports are inverted.

Speed adapters can be put in series to create high ratio drives. This can also create a design opportunity to increase service life, by allowing elements under high loads to experience a reduced number of loading cycles. The disclosed drives are illustrated with two or three reduction stages, but this number can vary from one to four or more to accommodate the desired ratio and service life.

A friction drive relies on friction between elements in rolling contact. A traction drive, on the other hand, transmits the efforts through the shearing of a lubricant—typically a traction lubricant which, under high contact pressures, forms solid films that protect surfaces and provide traction. In both cases, sufficient contact forces must be maintained to avoid slippage. These minimum forces are calculated by dividing the tangential forces by either the coefficient of friction or the traction coefficient. In both cases, with steel rolling elements and appropriate contact forces, stage efficiencies of 96 to 99% are possible. Unnecessarily overloading the contacts increases material fatigue and energy losses. One of the challenging design aspects is therefore to provide and maintain adequate contact forces. Many designs include a mechanism to vary the force according to the load. This has obvious benefits but also adds to the drive complexity, cost and potentially torsional flexibility. The disclosed drives have fixed contact forces, which are generated by springs, compressed hollow rollers or by surface impressions of the bodies in rolling contact. Three different reduction stages are disclosed; two have concentric input and outputs axes and a third one allows for an angle in-between these axes.

One additional consideration when selecting the contact forces in a traction drive is that contact pressures must be sufficient for the transition of the traction fluid from a liquid to a solid phase. This disclosure illustrates a way to increase the contact pressure at one critical point in some designs without reducing service life significantly.

Friction or traction contacts can be purely rolling or also present spin or sideslip. Spin and sideslip are detrimental to apparent friction and traction coefficients and to efficiencies and should be kept to a minimum when possible. The disclosed configurations use only pure rolling contacts.

Because of their performance characteristics such as high stiffness, high speed regulating accuracy, smooth torque transfer and low or zero backlash, traction or friction drives can be used as high-performance servo mechanisms. However, because their reduction ratio varies slightly with load, speed and other factors, an output position sensor is then required. Some of the illustrated embodiments integrate this optional position sensor.

According to an aspect of the invention, there is provided a speed-adapter drive to be inserted in a fixed frame and comprising:

a sun element;

at least three planet elements provided around the sun element and in rolling contact therewith for orbiting, and confined within the fixed frame to guide the orbiting, thus providing a fixed gear ratio for the speed-adapter drive, and in rolling contact with an inner surface of the fixed frame, wherein the at least three planet elements are in rolling contact with the sun element, the sun element and the planet elements having a smooth surface such that all rolling contacts are friction contacts or traction contacts and are toothless; and guided rollers in rolling contact with the at least three planet elements, but not in rolling contact with the sun element or the fixed frame, the orbiting of the at least three planet elements driving a corresponding orbiting of the guided rollers around the sun element to output a rotary movement with the fixed gear ratio for the speed-adapter drive.

According to an embodiment, the fixed frame is a cylinder concentric with the sun element, wherein the rolling contacts between the guided rollers and the at least three planet elements are preloaded to eliminate backlash.

According to an embodiment, the at least three planet elements in rolling contact with the sun element are free rollers in rolling contact with both the sun element and the inner surface of the fixed frame, wherein the rolling contact comprises a friction contact or a traction contact.

According to an embodiment, the free rollers comprise bores having diameters selected so that a rolling contact forces is controlled.

According to an embodiment, the sun element defines a longitudinal axis along which it extends, further comprising pins corresponding to the guided rollers, each one of the pins extending in the longitudinal axis through each one of the guided rollers corresponding thereto, each one of the pins maintaining the guided rollers corresponding thereto in a radial position about the sun element, the pins being used, under the orbiting of the guided rollers, to output the rotary movement of the orbiting guided rollers.

According to an embodiment, there is further provided a carrier into which the pins from the guided rollers engage, the carrier acting as an output for the speed-adapter drive.

According to another aspect of the invention, there is provided a speed-adapter drive to be inserted in a fixed frame and comprising:
  a sun element defining a longitudinal axis along which it extends;
  at least three planet elements provided around the sun element and in rolling contact therewith for orbiting, and confined within the fixed frame to guide the orbiting, and in rolling contact with an inner surface of the fixed frame, wherein the at least three planet elements are in rolling contact with the sun element, the sun element and the planet elements having a smooth surface such that all rolling contacts are friction contacts or traction contacts and are toothless, the orbiting of the at least three planet elements providing a rotary movement with a fixed-ratio drive reduction;
  pins corresponding to the at least three planet elements, each one of the pins extending in the longitudinal axis through each one of the at least three planet elements corresponding thereto, each one of the pins maintaining the at least three planet elements corresponding thereto in a radial position about the sun element, the pins being used, under the orbiting of the at least three planet elements, to output the rotary movement of the orbiting at least three planet elements;
  a carrier into which the pins from the at least three planet elements engage, the carrier acting as an output for the speed-adapter drive; and
  an accommodation for the pins to allow for a variation of the radial position of at least one of the at least three planet elements during the orbiting thereof without transmitting the variation of the radial position to the carrier.

According to an embodiment, the accommodation comprises providing a bushing inside the at least three planet elements, the bushing for each of the at least three planet elements having a bore having a central bore axis which is parallel but not coincident with a central longitudinal axis of a corresponding one of the at least three planet elements, allowing a movement of the central longitudinal axis of the at least three planet elements around the bore central axis of the bushing during their orbiting, the movement not being transmitted to the pins.

According to an embodiment, the bushing inside each one of the at least three planet elements comprise an external cylindrical surface, a center thereof defining the central longitudinal axis with which the central bore axis is parallel but not coincident, the bushing inside each one of the at least three planet elements being therefore eccentric.

According to an embodiment, the carrier comprising a plurality of engagement portions into which the corresponding pins engage, the accommodation comprising an opening being provided about each of the plurality of engagement portions to make the engagement portions flexible and allow the variation of the radial position of the pins which is not transmitted to the carrier.

According to an embodiment, the fixed frame is a cylinder concentric with the sun element.

According to an embodiment, the carrier acts as an output for the speed-adapter drive for a multi-stage arrangement.

According to an embodiment, the sun element is hollow to provide elasticity.

According to another aspect of the invention, there is provided a speed-adapter drive comprising:
  a first traction or friction gear element comprising a revolution surface and a first traction or friction gear axis;
  a second traction or friction gear element, with its rotation axis at an angle relative to the first traction or friction gear axis in a range between 45° and 135° and comprising a revolution surface; wherein the first traction or friction gear and the second traction or friction gear are urged together at their respective revolution surface by a biasing device to provide a rolling contact surface which is toothless.

According to an embodiment, at least one of:
  the revolution surface of the first traction or friction gear element; and
  the revolution surface of the second traction or friction gear element is convex at the rolling contact surface in a plane that includes the first traction or friction gear axis and the rotation axis of the second traction or friction gear element.

According to an embodiment, the rolling contact surface defines a plane which is tangent with the at least one revolution surface which is convex, wherein the plane coincides with an intersection of the first traction or friction gear axis and the second traction or friction gear axis.

According to an embodiment, the biasing device is a spring used on the first traction or friction gear element or on the second traction or friction gear element, for a longitudinal biasing thereof along the first traction or friction gear axis or the second traction or friction gear axis, respectively.

According to another aspect of the invention, there is provided a multi-stage speed-adapter drive comprising: a fixed frame; and more than one speed-adapter drive as mentioned above, connected in series within the fixed frame.

According to another aspect of the invention, there is provided a multi-stage speed-adapter drive comprising: a fixed frame; and —a first speed-adapter drive as mentioned above; —a second speed-adapter drive as mentioned above; wherein the first speed-adapter drive and the second speed-adapter drive are connected in series within the fixed frame.

According to an embodiment, the multi-stage speed-adapter drive further comprises the traction or friction speed-adapter drive forming an elbow for the multi-stage speed-adapter drive.

According to an embodiment, the multi-stage speed-adapter drive further comprises a circular groove on an internal surface of the fixed frame to increase a contact pressure between the rollers and the frame and to promote solidification of a traction fluid.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Referring to the prior art described above, some of the drawbacks most often encountered with toothed gears can be addressed by using a friction drive or a traction drive. Rather than contact between teeth, friction or traction drives rely on the friction or traction forces generated between smooth elements in rolling contact. Generally, a friction drive refers to a transmission with dry contacts while a traction drive refers to a transmission with lubricated contacts. As opposed to toothed gears, contacts are continuous (i.e., toothless), leading to significant opportunities to reduce noise, reduce vibrations, increase stiffness, run at higher speeds and eliminate backlash at the contact point.

Today, few fixed ratio speed adapters are commercially available. However, with continuously improving steel fatigue resistance, fluid traction properties, manufacturing techniques for rolling surfaces and position sensor technologies, fixed ratio traction or friction drives now seem poised to compete with traditional gearing technologies in many application fields. It is the object of this disclosure to describe compact friction or traction drive arrangements that can be manufactured at a reasonable cost and yet achieve the previously described performance benefits over their toothed counterparts.

Figure 1:
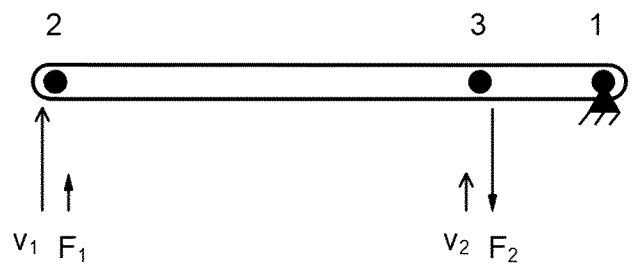
FIG. 1 illustrates a lever as a useful analogy to a rotary speed adapter.

Referring to the drawings, FIG. 1 shows a lever as a useful analogy to the function of a speed adapter stage. A lever has three interaction ports. One port—generally fixed—acts as the fulcrum. Depending on the length ratios, the force is increased or decreased between the two other ports, with the speed modified conversely. In the illustration, 1 is the fulcrum, 2 is the high-speed port and 3 is the low speed port.

Figure 2:
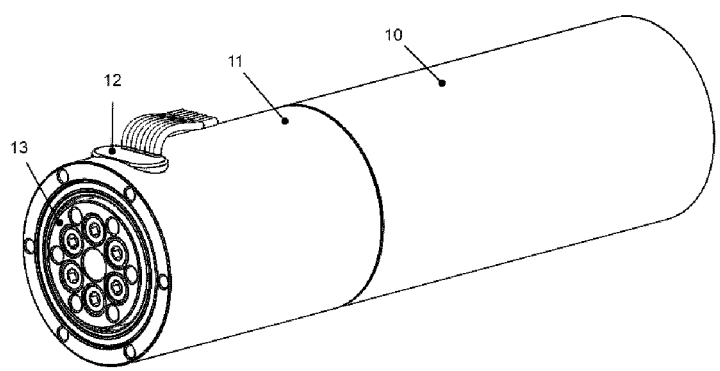
FIG. 2 illustrates a combination of an electromagnetic motor with a speed reducer using two reduction stages with similar working principles.

FIG. 2 shows a combination of an electromagnetic motor 10 with a traction or friction speed reducer. When the motor shaft turns, the output 13 of the drive rotates relative to its frame 11 and the motor with a reduced velocity and an increased torque. An optional position sensor 12 reads the position of this output.

Figure 3:
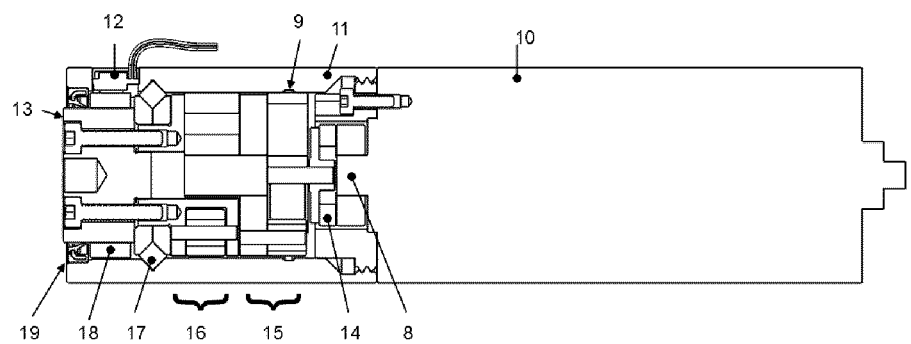
FIG. 3 illustrates a section view of the combination of FIG. 2.
Figure 4:
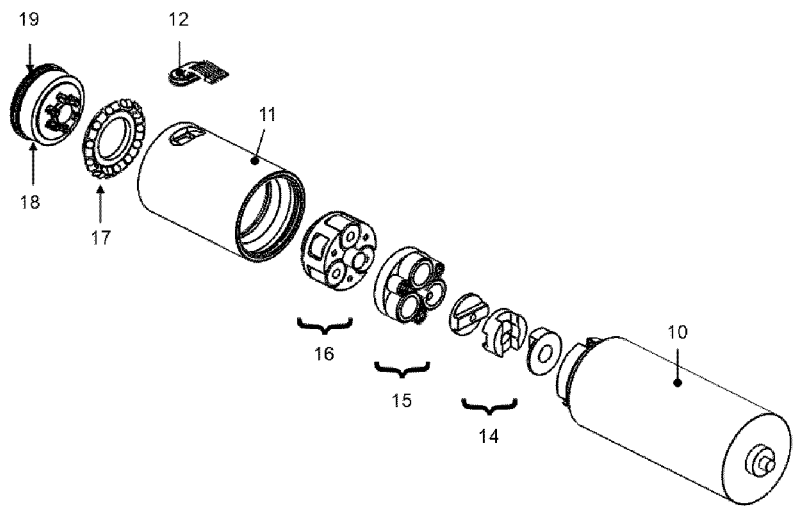
FIG. 4 illustrates an exploded view of the combination of FIG. 2.

FIGS. 3 and 4 show section and exploded views of the speed reducer. An optional coupling 14 is placed between the motor shaft 8 and the reducer to allow misalignments. The rotary motion then goes through a first speed reduction stage 15 and a second speed reduction stage 16. The output axis is guided by bearing elements, here illustrated as a cross-roller bearing 17. An optional seal 19 protects the drive from ingress and retains lubricants. The optional position sensor 12 reads the position of the ring 18. According to an embodiment, the ring 18 is encoded (e.g., on its surface) such as to have its angular position readable by the optional position sensor 12.

Figure 5:
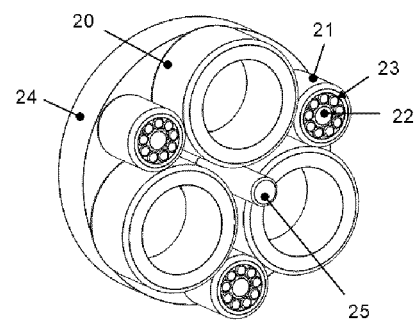
FIG. 5 illustrates the first speed reduction stage of the combination of FIG. 2.
Figure 6:
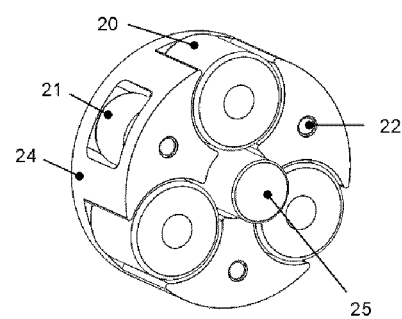
FIG. 6 illustrations the second reduction stage of the combination of FIG. 2.
Figure 7:
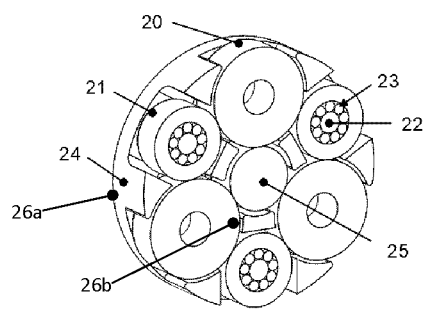
FIG. 7 illustrates a section view of the second reduction stage of the combination of FIG. 2.

FIGS. 5 and 6 illustrate the first and second stages of the speed reducer. FIG. 7 shows a section view of this second stage. Both stages have similar working principles. In their center, a sun element 25 (analog to lever port 2 from FIG. 1), with an external rolling surface, rotates. Frame 11 (omitted for clarity), with an internal rolling surface, is fixed and represents the fulcrum (analog to lever port 1). Three or more free rollers 20, with external rolling surfaces, are placed in the annular space in-between with a chosen amount of interference. When the sun rotates, the free rollers roll between the sun and the frame and describe an orbital motion confined by the frame 11. Guided rollers 21 rotating around pins 22 and optionally supported by bearing elements such as needle rollers 23 transmit this motion to a carrier 24 (analog to lever port 3). The nominal reduction ratio of each stage is the diameter of the frame surface divided by the diameter of the sun surface, plus one. Typical ratios are 14:1 to 3:1, depending on the relative diameters of these parts. The overall drive ratio is the product of the stages ratios that are provided in series in the multi-stage drive.

A carrier wall portion, either external (26a) or internal (26b), connects the front and back walls of the carrier shown in FIG. 7 to increase the torsional rigidity of the reduction stage. Advantageously, both the free rollers 20 and the guided rollers 21 are not in contact with the carrier wall portions 26a, 26b, to ensure that there is no friction loss with this part of the carrier. In other words, the guided rollers 21 have their pin 22 engaged with the carrier 24 the rotation thereof, but do not contact the carrier wall portions 26a, 26b. A gap is therefore provided in-between to ensure that there is no contact.

A small amount of play between the free rollers 20 and the guided rollers 21 allows for larger manufacturing tolerances, but, if all contacts are rolling, a preload is possible for zero backlash. For the free rollers 20, the amount of interference is chosen to ensure that parts dimensional tolerances cause only acceptable preload variations. The required normal forces are calculated according to the target transmissible torque and roller lengths are selected according to the target service life. The free rollers also present optional bores, as shown in FIG. 7, with diameters selected so that the interferences generate only the required contact forces. The surface impressions of the bodies in contact must also be considered in the calculation of these diameters. The general deformation of the frame and of the sun roller must also be considered.

In FIG. 3, a groove 9 is visible on the internal rolling surface of the frame 11 of the drive (either multi-stage or single-stage drive). This groove reduces the contact length with the free rollers. At this point, because the reduced radius of curvature of the bodies in contact is large, contact pressures are low. It is thus possible that a reduction in contact length be required to ensure sufficient pressure for the phase transition of the traction fluid in the first speed reduction stage 15 to thereby promote solidification of the traction fluid. Nevertheless, even with a slightly reduced contact length, because the pressure remains low compared to the contact between the sun and the free roller, this contact does not play a significant role in the expected drive fatigue life.

Figure 8:
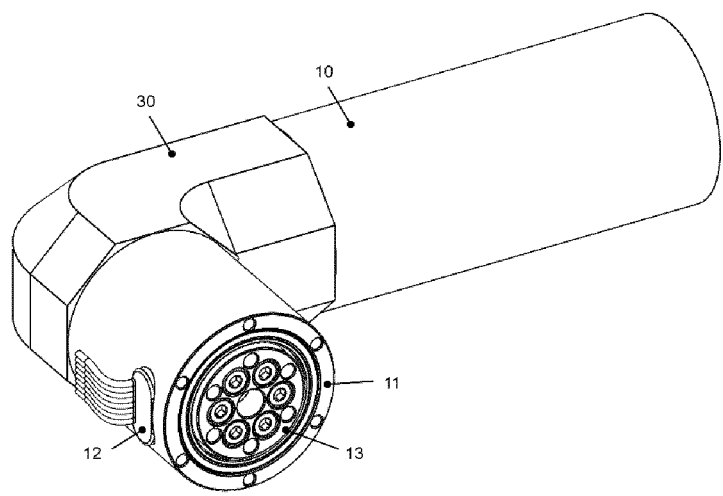
FIG. 8 illustrates a combination of an electromagnetic motor with a three-stage speed reducer. The input stage of this reducer, in addition to a possible speed modification, allows for an angle between the input and output axes.

Now referring to another embodiment, FIG. 8 illustrates another combination of an electromagnetic motor 10 with a traction or friction speed reducer, this time with three stages and including an elbow. When the motor shaft turns, the output 13 of the drive rotates relative to its frame parts 30 and 11 and to the motor with a reduced speed and an increased torque. The last two stages of the drive are of the same type as the combination of FIG. 2, but a different input stage is added to allow for an angle between the input and output axes which is not 0° (as in the previously described embodiments), for example 90□, or an angle in the range between 45° and 135°. An optional sensor 12 reads the position of the output.

Figure 9:
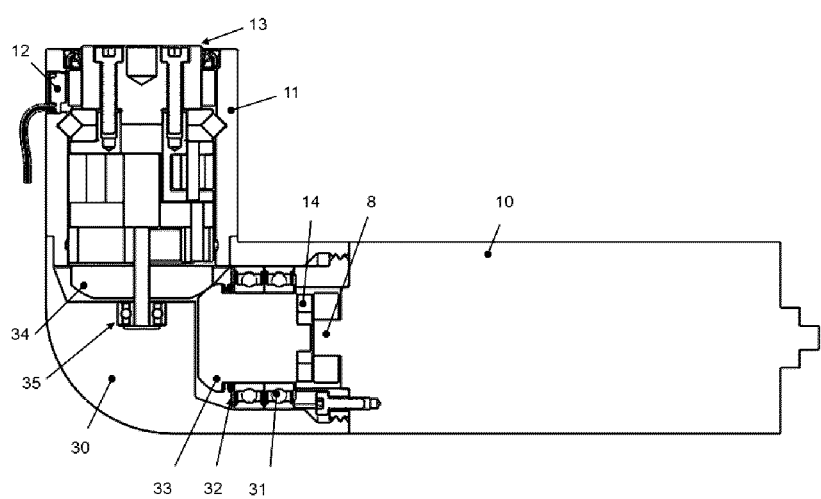
FIG. 9 illustrates a section view of the combination of FIG. 8.
Figure 10:
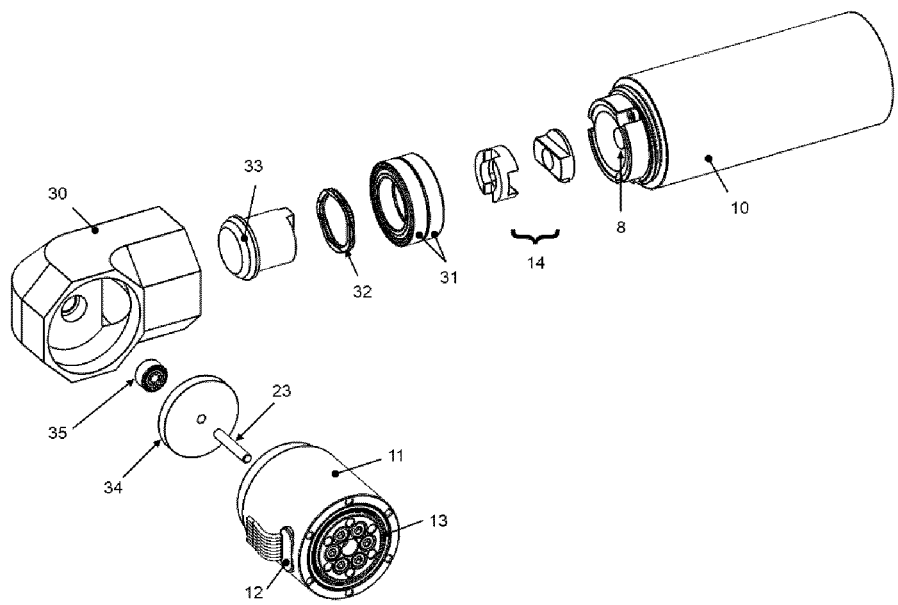
FIG. 10 illustrates an exploded view of the combination of FIG. 8.
Figure 11:
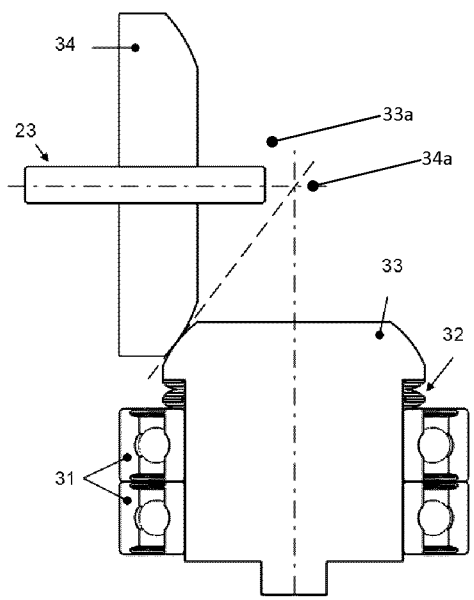
FIG. 11 illustrates elements of the first speed reduction stage of the combination of FIG. 8.

FIGS. 9 and 10 show section and exploded views of the speed reducer. FIG. 11 illustrates a section view of isolated elements of the first reduction stage. An optional coupling 14 is placed between the motor shaft 8 and the drive to allow misalignments. The rotary motion is then transferred to part 33, guided by bearing elements 31 and pushed by compressed spring element 32 (aka biasing device) towards element 34. Elements 33 and 34 are gears which present generally conical surfaces in rolling contact (e.g., they are shown as being frustoconical, with the conical portions in rolling contact), with a possible curvature in the other plane to help accommodate misalignments. The rotations axes of those gears intersect at an angle which is significantly different from 0° (e.g., perpendicular, as shown in FIGS. 8-10 and also formally shown in FIG. 11 as axes 33a, 34a), which can be in the range between 45° and 135°, for example. Bearing element 35 supports the rotation axis of element 34. Sun element 25 is the input of the next stage. The nominal ratio of the stage equals the ratios of the rolling surfaces diameters at the contact point.

Friction or traction contacts can be purely rolling or also present spin or sideslip. Spin and sideslip reduce efficiencies, reduce the traction or friction properties and can accelerate the surface degradations. When two surfaces with non-parallel rotation axis are in rolling contact, spin is eliminated when both rotation axes converge in one point that resides within the contact plane (i.e. the plane tangent to the contact point or contact line), as indicated by the dashed lines in FIG. 11. To accommodate assembly and manufacturing tolerances, the line contact of the two truncated cones is advantageously modified to a point contact by having at least one of the elements 33 and 34 convex in the plane containing the rotation axis, i.e., both of them are convex in that plane, or one of them is convex and the other one is flat, thus providing the point contact. FIG. 11 shows that when the convex surface of each one of the elements 33, 34 are in rolling contact (and urged each one against the other by the compressed spring element 32), they define a plane which coincides with the point in space where the longitudinal axes 33a, 34a of each one of the elements 33, 34 meet.

Compared to the more common toothed bevel gear arrangements, the continuous nature of transmission illustrated in FIG. 11 having only friction engagement between the gear elements leads to significant opportunities to reduce noise, reduce vibrations, eliminate backlash, increase stiffness and increase speed capabilities. To exploit those opportunities, it can be used as a stand-alone transmission element, as the input stage of a multi-stage friction or traction drive or as the input stage of any other type of speed reducer. The increased stiffness and low-backlash are particularly useful for a use in high-precision actuators, i.e., actuators with a high spatial precision.

Figure 12:
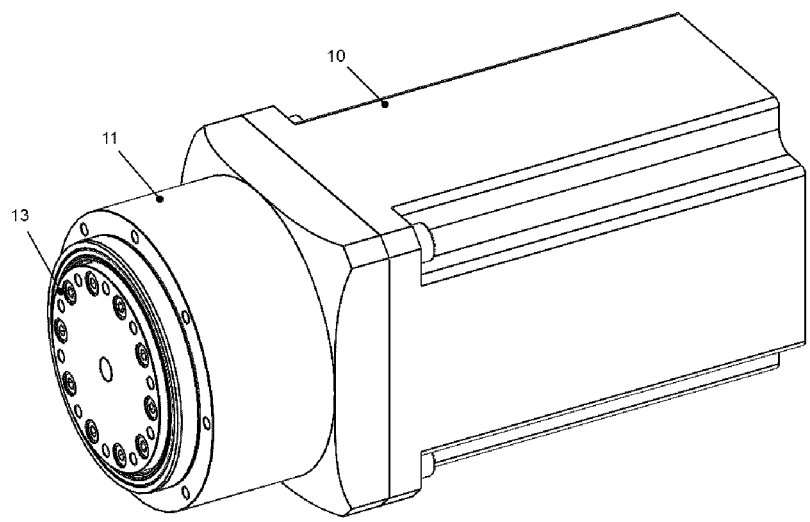
FIG. 12 illustrates a combination of an electromagnetic motor with a two stages speed reducer. In this design, a third type of reduction stage is introduced and used as the output stage.

FIG. 12 illustrates another combination of an electromagnetic motor 10 with a traction or friction speed reducer, this time having two reduction stages (and no elbow). When the motor shaft turns, the output 13 rotates relative the frame 11 and the motor with a reduced speed and an increased torque. The first stage is similar to stages of the combination illustrated in FIGS. 2 to 7, but the output stage differs.

Figure 13:
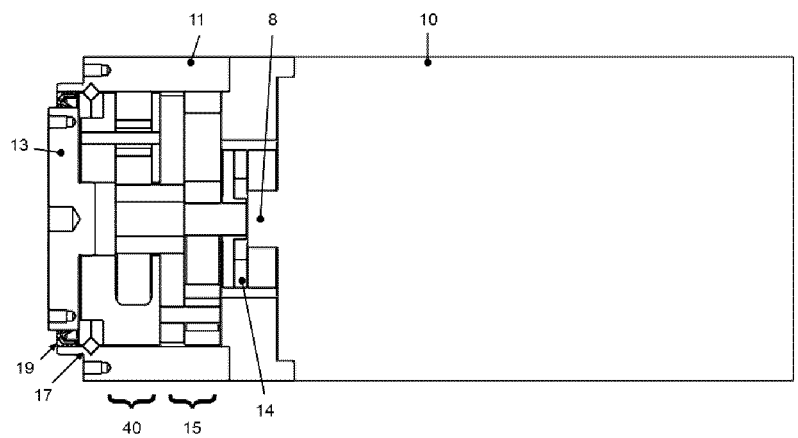
FIG. 13 illustrates a section view of the combination of FIG. 12.
Figure 14:
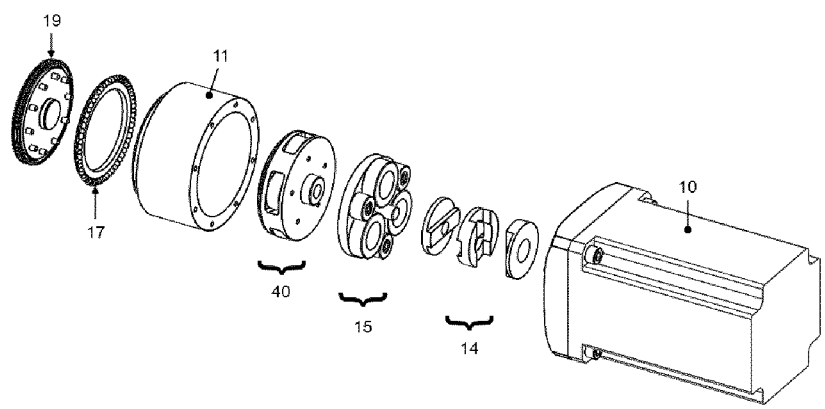
FIG. 14 illustrates an exploded view of the combination of FIG. 12.

FIGS. 13 and 14 illustrate section and exploded views of the reducer. An optional coupling 14 is placed between the motor shaft 8 and the reducer to allow misalignments. The rotary motion then goes through a first and second speed reduction stages, 15 and 40. The output axis is guided by bearing elements, here illustrated as a cross-roller bearing 17. An optional seal 19 protects the drive and retains lubricants.

Figure 15:
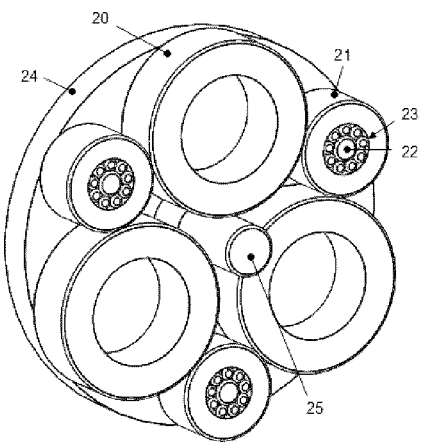
FIG. 15 illustrates the first speed reduction stage of the combination of FIG. 12.

FIG. 15 illustrates the first stage of the reducer, with a working principle as described for the stages of the combination illustrated in FIGS. 2 to 7.

Figure 16:
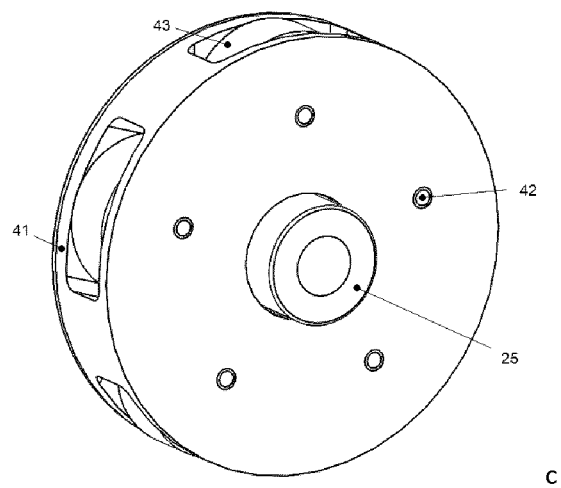
FIG. 16 illustrates the second reduction stage of the combination of FIG. 12.
Figure 17:
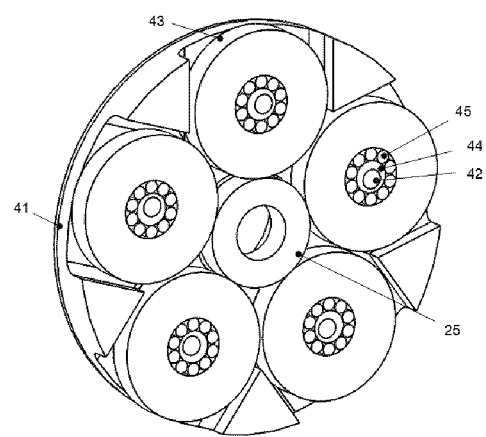
FIG. 17 illustrates a section view of the second reduction stage of the combination of FIG. 12.

Now referring to another embodiment, FIG. 16 illustrates the second stage, of which FIG. 17 shows a section view. In the center, a sun element 25 (analog to lever port 2 from FIG. 1), with an external rolling surface, rotates. Frame 11 (omitted for clarity, normally all around and enclosing the stage), with an internal rolling surface, is fixed and represents the fulcrum (analog to lever port 1). In this particular embodiment of a stage, there are no free rollers and guided rollers; instead, all planet elements are rollers in contact with the sun.

In this embodiment, three or more rollers 43, for example five rollers as illustrated, with external rolling surfaces and concentric bores (i.e., a circular bore concentric with the circular external rolling surface), are placed in the annular space in-between with a chosen amount of interference. When the sun rotates, the rollers roll between the sun element 25 and the frame 11 (i.e., the frame that would enclose the stage) and describe an orbital motion. This motion is transmitted to the carrier 41 (analog to lever port 3) through pins 42, eccentric bushings 44, and optional bearing elements such as the illustrated needle rollers 45.

It should be noted that the rollers do not push onto the carriers, as the rollers are free to roll and do not enter in contact with the side walls of the carrier, as previously noted with respect to the description of the embodiment of FIG. 7. It is their pin 42 which extends in the longitudinal direction (i.e., not radially from the sun element 25) which engages with the carrier 41, such that a revolution movement of the rollers 43 drives the revolution movement of the pins 42 accordingly, and the engagement of said pins 42 with the carrier 41 ensures that the carrier 41 spins under the effect of the pins 42 driving it into the rotation movement.

Therefore, the sun element 25 indirectly drives the carrier 41 with the rollers 43 in-between, and the nominal reduction ratio of the stage is the diameter of the frame surface divided by the diameter of the sun surface, plus one. Typical ratios are 14:1 to 3:1.

In the illustrated embodiment, the rollers 43 are guided by rolling elements 45 that form a needle roller bearing. This bearing makes use of the external surface of an eccentric bushing 44 for its internal raceway. This bushing itself has a bore to accommodate pin 42. The axes of the bore and of the external cylindrical surface of eccentric bushing 44 are parallel but not concentric. In other words, the bore and the external rolling surface of a roller 43 are circular and concentric, but the pin 42 inside the bore is not necessarily concentric. This eccentricity, shown in FIG. 17 (where the slight eccentricity of the pins 42 inside the bores is visible) allows the rotation axis of a roller to describe an arc around its pin 42 axis to accommodate misalignments and other imprecisions. Since the circular shape of the external rolling surface of a roller 43 may not be perfect (i.e., it is within a given tolerance range which is small but not 0), the rolling movement of the rollers into a revolution movement around the sun element could introduce small variations in the radial position of the pins 42 with respect to the sun element 25. To accommodate for this, the internal bore inside the bushing 44 is eccentric. This means that the bore defines a bore central axis, and the outside surface of the bushing is cylindrical and also defines a central longitudinal axis. Eccentricity means that these axes are parallel but not coincident. The central longitudinal axis should be the central longitudinal axis of the planet element in which the bushing is installed. This accommodation ensures smoothness of the overall transmission movement. Otherwise, the pin 42 would be forced to have small variations with respect to the sun element 25, but since the pin 42 extends longitudinally to engage with the carrier 41, that would create an undesirable tension (including mechanical losses, material fatigue and noise).

Figure 19:
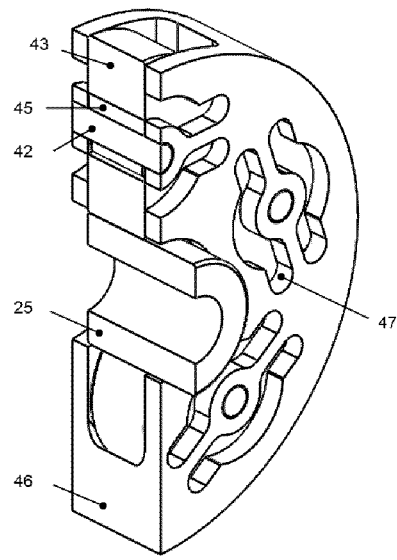
FIG. 19 illustrates a section view of this alternative embodiment for the second reduction stage of the combination of FIG. 12.

In this arrangement, the surface impressions of the bodies in contact and the general deformation of the frame and of the sun (if hollow, as shown in FIG. 17 or 19), provide the flexibility that control the contact forces. Significant general deformation of the rollers 43 is not desirable as it could be detrimental to the function of the needle rollers 45 or of the eccentric bushings 44.

This reduction stage arrangement can have advantages over the arrangement of the first stage. Most importantly, the number of rollers can sometimes be increased, leading to an augmentation of torque capacity, service life and torsional rigidity. However, for this arrangement to be suitable, because roller bores cannot deform too significantly, most of the elasticity that generates and maintains the contact forces should be attributed to roller-sun and roller-frame contact elasticities and frame and sun (if hollow) deformations. This arrangement works well with high contact forces that in turn generate sufficient contact impressions. It is thus a good candidate for the output stage of a reducer, in which the rotation speed is smaller but the torque is large.

Figure 18:
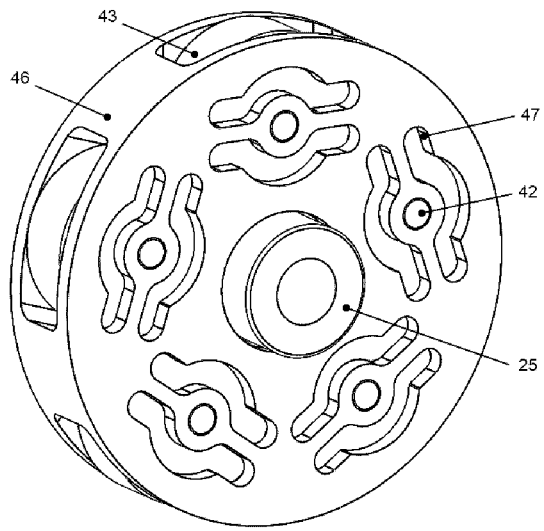
FIG. 18 illustrates an alternative embodiment for the second reduction stage of the combination of FIG. 12.

FIG. 18 illustrates an alternative embodiment for the second stage of the reducer with a similar working principle, i.e., providing accommodation with the slight variations in the radial position of the rollers during their revolution around the sun element 25 due to their non-perfect circular shape (i.e., non-zero tolerance). In this embodiment, the accommodation is not provided by placing a bushing with parallel but eccentric bore and external cylindrical surfaces between the pin and the needle roller bearing of the planet element it is rather provided by ensuring that the engagement of the pin 42 into the carrier 46 can undergo said slight variations in the radial position by making this engagement less rigid. FIG. 19 shows a section view. Again, the sun element 25, with external rolling surface, is placed at the center. Frame 11 (again, omitted for clarity), with internal rolling surface, is fixed. Rollers 43, with external rolling surfaces and concentric bores, are placed in the annular space in-between with a chosen amount of interference. When the sun rotates, the rollers roll between the sun and the frame and describe an orbital motion. This motion is communicated to the carrier 46 through pins 42 (which extend longitudinally and engage with the carrier 46) and optional bearing elements such as the illustrated needle rollers 45. This time, the carrier 46 is designed to provide flexibility for the radial position of the rollers. This flexibility accommodates misalignments and other imprecisions. In the illustrated carrier, openings 47, provided about the connection points of the pins 42 with the carrier, produce this flexibility for the carrier (i.e., it is made less rigid where the pins 42 engage with the carrier thanks to these openings 47) that is shaped as a surface normal to the rotation axis of the drive.

Figure 20:
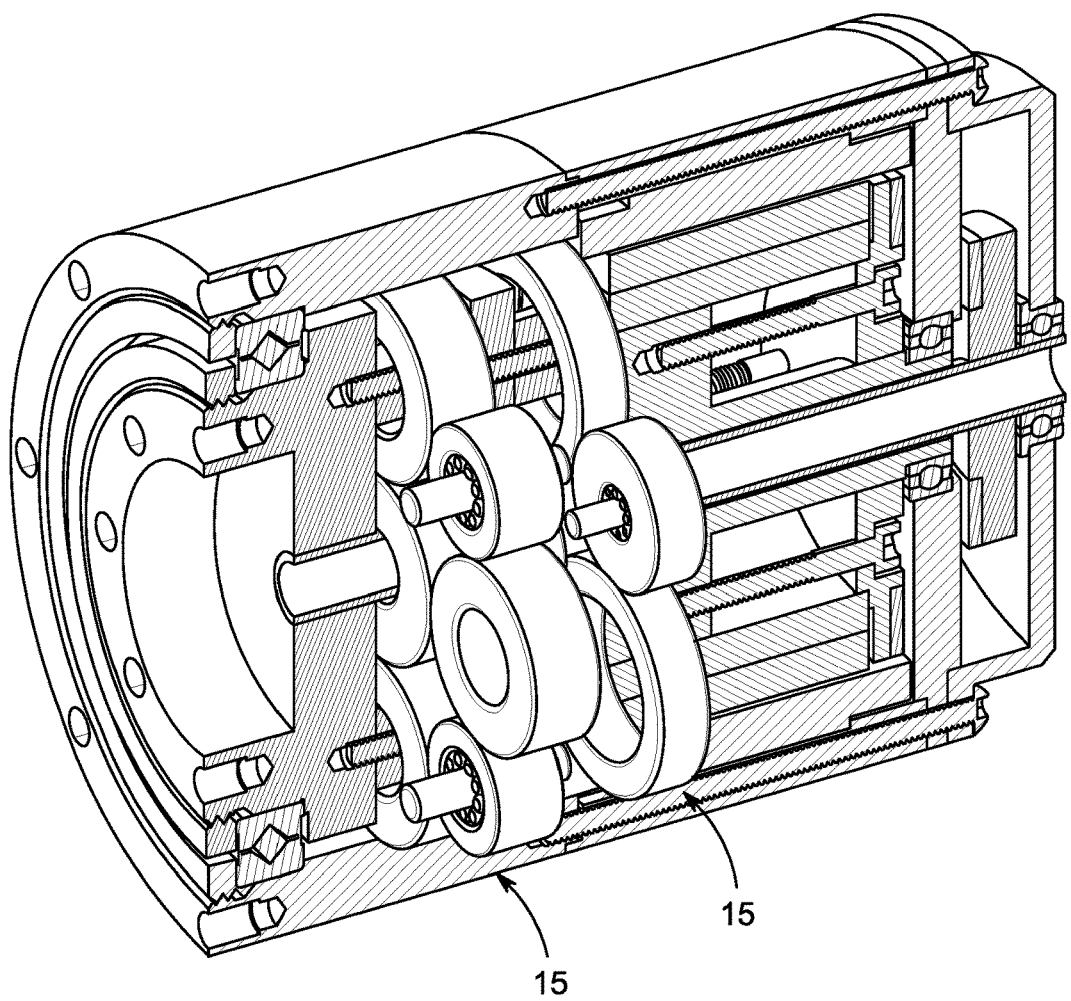
FIG. 20 is a section view illustrating an exemplary embodiment of an actuator comprising a multi-stage speed reducer.

While FIGS. 4 and 10 illustrate a multi-stage drive having two stages which are different (15, 16), FIG. 20 illustrates a multi-stage drive having two stages (could be more) which are the same (15, 15), one having the output becoming the input for the other (carriers are removed from the figure for visibility). The stage 15 being repeated in series is shown in FIG. 21, being simply the same as in FIG. 5 but shown in front view.

Figure 21:
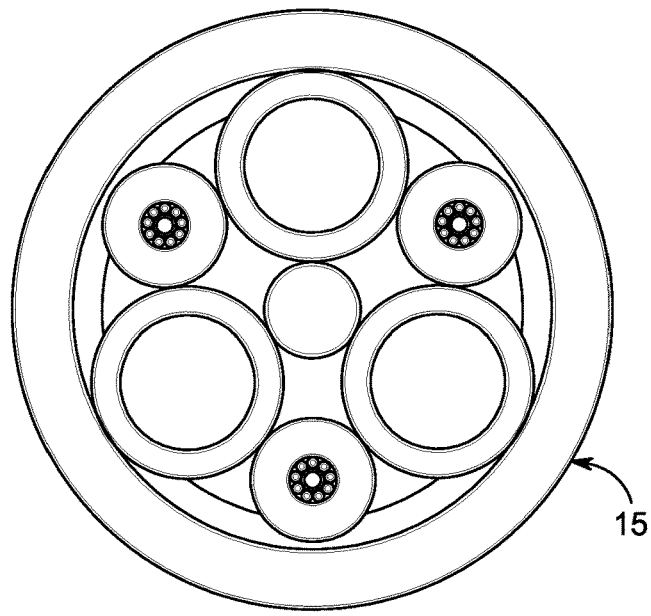
FIG. 21 is a cross-section illustrating an exemplary embodiment of a guided-roller speed-reducer stage.
Figure 22:
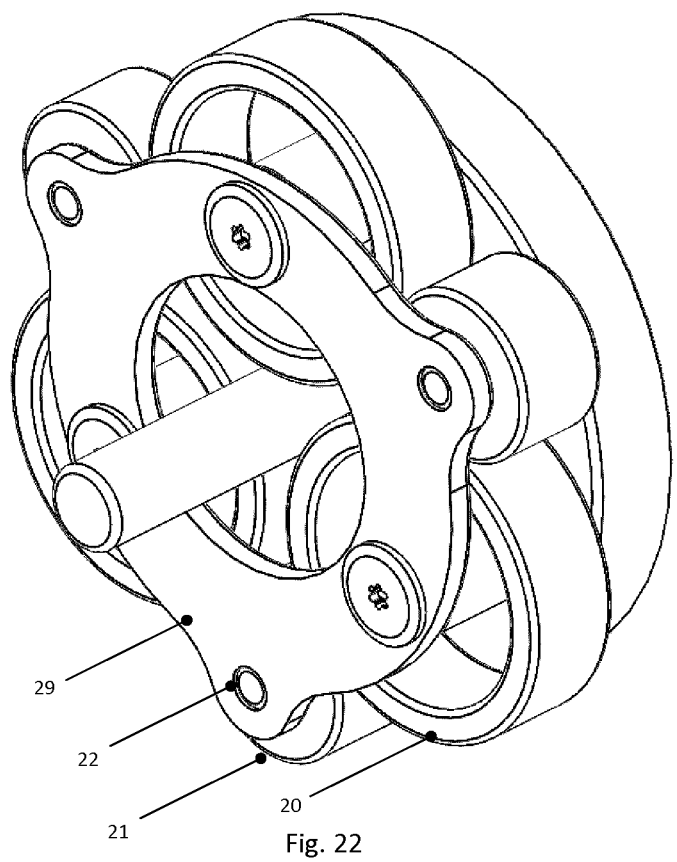
FIGS. 22-23 are perspective views illustrating an exemplary embodiment of a guided-roller speed-reducer stage, as a whole (FIG. 22) and as a cross-section (FIG. 23).
Figure 23:
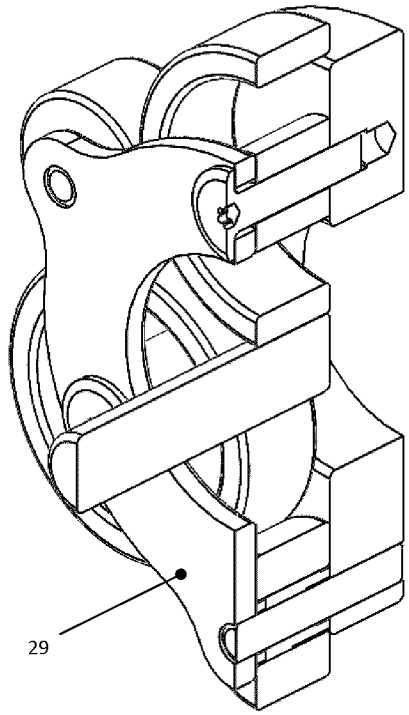

An embodiment similar to the one of FIG. 21 is shown in FIGS. 22-23. A plate 29 is provided to ensure high torsional rigidity. The plate 29 holds in place the pins 22 and the guided rollers 21, while also guiding the free rollers 20.

The arrangements described above have many advantages which go beyond noise reduction. For example, the possibility of preloading all contact points and eliminate backlash is useful for high precision positioning applications. In addition, the high torsional rigidity made possible with preloaded traction contacts increases the performance of motion systems and reduce the occurrence and amplitude of undesired vibrations. Furthermore, rolling contacts are highly efficient, reducing energy losses and undesirable frictions. This can be advantageously put into use in high-precision actuators.

Moreover, the different embodiment for stages described above can be made in a variety of ratios (3:1 to 14:1), which means that combining them can provide a large variety of total ratios for the multi-stage drive. Furthermore, the multi-stage arrangement can be very useful for improving the life of the drive, because entry stages undergo a high number of cycles but with low torque, while the output stages have higher torque (i.e. higher preloads and contact forces) but undergo a smaller number of cycles.

The use of line contacts (i.e. the contacts between cylindrical rolling surfaces) ensures that a greater torque can be achieved, compared to the use of balls as found in the prior art. Moreover, in the case of a traction drive (i.e., with fluid), any impact will cause the fluid to shear and to dissipate energy, thus mitigating the effect of a mechanical impact.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A speed-adapter drive to be inserted in a fixed frame and comprising:
   a sun element;
   at least three planet elements provided around the sun element and in rolling contact therewith for orbiting, and confined within the fixed frame to guide the orbiting, thus providing a fixed gear ratio for the speed-adapter drive, and in rolling contact with an inner surface of the fixed frame, wherein the at least three planet elements are in rolling contact with the sun element, the sun element and the planet elements having a smooth surface such that all rolling contacts are friction contacts or traction contacts and are toothless; and
   guided rollers in rolling contact with the at least three planet elements, but not in rolling contact with the sun element or the fixed frame, the orbiting of the at least three planet elements driving a corresponding orbiting of the guided rollers around the sun element to output a rotary movement with the fixed gear ratio for the speed-adapter drive,
   wherein the fixed frame is a cylinder concentric with the sun element, and
   wherein the sun element, the fixed frame, the at least three planet elements and the guided rollers rolling all have external rolling surfaces that are cylindrical, the axes of which all being parallel, so that all rolling contacts are line contacts parallel to the rotation axes.

2. The speed-adapter drive of claim 1, wherein the at least three planet elements in rolling contact with the sun element are free rollers in rolling contact with both the sun element and the inner surface of the fixed frame, wherein the rolling contact comprises a friction contact or a traction contact.

3. The speed-adapter drive of claim 2, wherein the free rollers comprise bores having diameters selected so that preload contact forces with the sun element, the fixed frame and the guided rollers are controlled.

4. The speed-adapter drive of claim 3, wherein the sun element defines a longitudinal axis along which it extends, further comprising pins corresponding to the guided rollers, each one of the pins extending parallel to the longitudinal axis through each one of the guided rollers corresponding thereto, each one of the pins maintaining the guided rollers corresponding thereto in a radial position about the sun element, the pins being used, under the orbiting of the guided rollers, to output the rotary movement of the orbiting guided rollers.

5. The speed-adapter drive of claim 4, further comprising a carrier into which the pins from the guided rollers engage, the carrier acting as an output for the speed-adapter drive.

6. A multi-stage speed-adapter drive comprising the speed-adapter drive of claim 1, further comprising an elbow speed-adapter drive comprising:
   a first traction or friction gear element comprising a revolution surface and a first traction or friction gear axis; and
   a second traction or friction gear element, with its rotation axis at an angle relative to the first traction or friction gear axis in a range between 45° and 135° and comprising a revolution surface;
   wherein the first traction or friction gear and the second traction or friction gear are urged together at their respective revolution surface by a biasing device to provide a rolling contact surface which is toothless.

7. The multi-stage speed-adapter drive of claim 6, wherein at least one of
   the revolution surface of the first traction or friction gear element, and
   the revolution surface of the second traction or friction gear element
   is convex at the rolling contact surface in a first plane that includes the first traction or friction gear axis and the rotation axis of the second traction or friction gear element.

8. The speed-adapter drive of claim 7, wherein the rolling contact surface defines a second plane which is tangent with the at least one revolution surface which is convex, wherein the second plane coincides with an intersection of the first traction or friction gear axis and the rotation axis of the second traction or friction gear element.

9. The speed-adapter drive of claim 8, wherein the biasing device is a spring used on the first traction or friction gear element or on the second traction or friction gear element, for a longitudinal biasing thereof along the first traction or friction gear axis or the rotation axis of the second traction or friction gear element, respectively.

10. The speed-adapter drive of claim 1, namely a first speed-adapter drive, in combination with:
    the fixed frame; and
    a second speed-adapter drive;
    wherein the first speed-adapter drive and the second speed-adapter drive are connected in series within the fixed frame.

11. The speed-adapter drive of claim 10, further comprising a circular groove on an internal surface of the fixed frame to increase a contact pressure between the rollers and the frame and to promote solidification of a traction fluid.

12. The speed-adapter drive of claim 1, further comprising a circular groove on an internal surface of the fixed frame to increase a contact pressure between the rollers and the frame and to promote solidification of a traction fluid.

13. The speed-adapter drive of claim 1, wherein the rolling contacts between the guided rollers and the at least three planet elements are preloaded to eliminate backlash, resulting in a zero backlash transmission.

\* \* \* \* \*